United States Patent [19]

Castagnoli

[11] Patent Number: 5,012,680

[45] Date of Patent: May 7, 1991

[54] STRESS GAUGE FORCE SENSING DEVICE

[75] Inventor: Claude Castagnoli, Mery Sur Seine, France

[73] Assignee: Tractel S. A., Montreuil, France

[21] Appl. No.: 412,291

[22] Filed: Sep. 22, 1989

[30] Foreign Application Priority Data

Sep. 23, 1988 [FR] France .................... 88 12445

[51] Int. Cl.⁵ .................... G01L 1/22; G01L 5/10
[52] U.S. Cl. .................... 73/862.39; 73/862.65
[58] Field of Search ........... 73/862.39, 862.42, 862.44, 73/862.54, 862.56, 862.48, 862.65; 177/147

[56] References Cited

U.S. PATENT DOCUMENTS

| | | | |
|---|---|---|---|
| 4,015,468 | 4/1977 | Simon | 73/862.54 |
| 4,140,010 | 2/1979 | Kulpmann et al. | 73/862.56 |
| 4,171,639 | 10/1979 | Simon | 73/862.54 |

Primary Examiner—Charles A. Ruehl
Attorney, Agent, or Firm—William A. Drucker

[57] ABSTRACT

A stress gauge force sensing device is provided comprising a circular ring connected to a hub by a sector. The hub bears on a shaft integral with a supporting structure. The end of the tie to which the load is applied passes round the ring then is connected to the supporting strand of this tie by a fastener. The sector, which supports the stress gauge system, is placed, in the axis of the force, along the radius of the ring situated on the same side as the load with respect to the axis of the ring. The stress sensor forms at the same time a coupling member for the tie supporting the load and thus reduces the length which interpositioning of the sensing device occupies in the load line.

6 Claims, 2 Drawing Sheets

STRESS GAUGE FORCE SENSING DEVICE

BACKGROUND OF THE INVENTION

The present invention relates to a force sensing device and, more particularly, a force sensing device operating with stress gauges.

Force sensing devices are known using stress gauges which make it possible to record and/or display a load and/or relay such sensing for use for different purposes such as controlling any member whatsoever.

In a widely used model, this type of device is in the form of a strip, generally made from metal, having two parallel bores, one of which is fixed to a fixed point and the other of which is connected to a load by an appropriate tie. Said strip is provided with a stress gauge system situated between the two bores, which makes it possible, through the deformation of the strip generated by the force applied, to sense this force and to emit an analog signal proportional to the value of the force sensed. From this signal complementary devices record and/or display the force applied and/or control any member whatsoever.

In the known type of sensor described above, the stress gauge system is placed, on the structure of the sensor, in the gap between the application point of the load and the point of application of the reaction provided by the support structure to which the sensor is coupled.

SUMMARY OF THE INVENTION

The object of the present invention is to provide a sensing device for obtaining a sensing zone subjected to a tractive force along the common axis of two forces of opposite directions directed one towards the other, from stresses created by these forces and transmitted to the sensing zone by an adequate structure to which these two forces are applied.

To this end, the sensing zone is situated, along the axis common to the two forces creating stresses, outside the gap between the points of application of these two forces.

The sensing zone is formed of a sector one end of which is connected directly to the closest application point of one of the forces, and the other end of which is connected to the point of application of the other force by means of lateral arms disposed symmetrically with respect to the axis common to the two forces and joining up at this latter point of application, along a plane common to the axis of the two forces.

The device of the invention is formed by a ring which is connected to a hub, along a single radius, by a sector supporting the stress gauge system and disposed in the axis of the forces. This sector has its connecting point with the ring in a position diametrically opposite the point of application, on the ring, of the force antagonistic to that applied to the hub.

In an advantageous embodiment, the ring has a peripheral section with a plane of symmetry merging with the median plane of the ring, so as the receive the passage of a tie (such as a cable, strap, chain or similar) forming a loop about the device and whose end is fixed to the strand of the same time which supports a load. The hub bears on a shaft which passes therethrough and connects it to a coupling structure. The device thus constructed then forms a coupling member at the same time as a compact force sensor.

DESCRIPTION OF THE PREFERRED EMBODIMENTS

Figure 1:
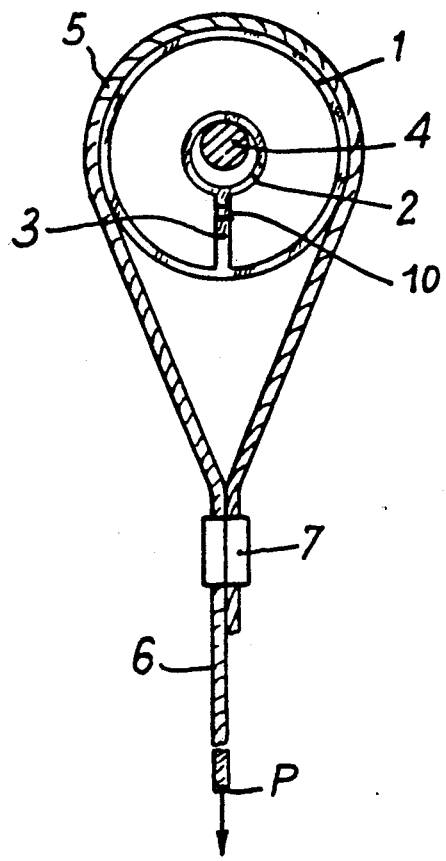
FIG. 1 is an elevational view, partially in section, of a force sensing device in accordance with the invention.

Referring to FIG. 1, the force sensing device is in the form of a circular ring 1 connected to a hub 2 by a single sector 3 which is placed, in the axis of the force, along the radius of ring 1 situated on the same side as load P with respect to the axis of the ring. This sector 3, having an approximately square section, is intended to carry the stress gauge system 10. The hub 2 bears on a shaft 4 which passes through it and which is fast with a supporting structure 11 (see FIG. 4).

The end 5 of tie 6 to which load P is applied is passed over ring 1 then connected to the supporting strand of this tie by an appropriate system 7 (such as a sleeve, cable clamp, clips or similar) to form a loop. The periphery of the ring is shaped as a thimble and its section has a shape corresponding to that of the section of tie 6 and may in particular be flat, convex, concave, trapezoidal or in the sahpe of a V. it has a plane of symmetry which coincides with the median plane of the ring, so as to provide correct alignment of the stress lines through the structure of the device.

So as to concentrate, in the transverse plane of symmetry of the device (with which plane the sector 3 supporting the stress gauge system is aligned), transmission to the device of the reaction force of the supporting structure opposed to load P, the diameter of shaft 4 supporting hub 2 is substantially less than the diameter of this hub, so as to reduce the contact between shaft 4 and hub 2 to the generatrix common to these two elements. Thus, the transmission to the device of the reaction force opposed to the load is concentrated by the supporting structure through the shaft of the hub in the plane transverse to the device.

Figure 2:
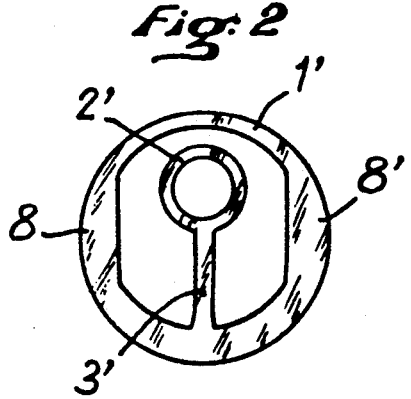
FIGS. 2 and 3 are elevational views of two variants of the device of FIG. 1.

As shown in the variant of FIG. 2, in order to extend to a maximum the zone of the tractive forces on which the stress gauge system is placed, the shaft of hub 2' is offset, parallel to the axis of ring 1', by the diameter of this ring passing through sector 3' providing connection between the hub and the ring, on the side diametrically opposite that of the load. Such a conformation promotes in addition self-alignment of the device along the axis of the force applied.

As is also shown in the variant of FIG. 2, ring 1' comprises a reinforcement of its section in its two lateral zones 8, 8' which are diametrically opposite with respect to the transverse plane of symmetry of the device, so as to limit as much as possible deformation of ring 1' under the effect of the load.

Figure 3:
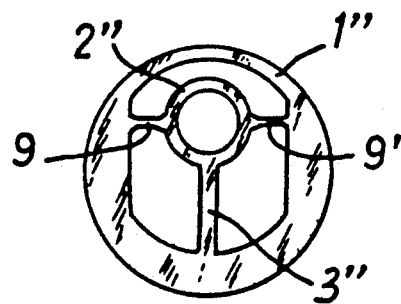

In another variant shown in FIG. 3, ring 1" is joined to hub 2", in addition to sector 3" supporting the stress gauge system, by two stiffening sectors 9, 9' which are situated on each side of the transverse plane of symmetry of the device and oriented perpendicularly thereto. Such as conformation neutralizes the effects of possible offcentering of hub 2" and its coupling shaft, while reducing the influence of these additional connections 9, 9' on the transmission of stresses.

Figure 4:
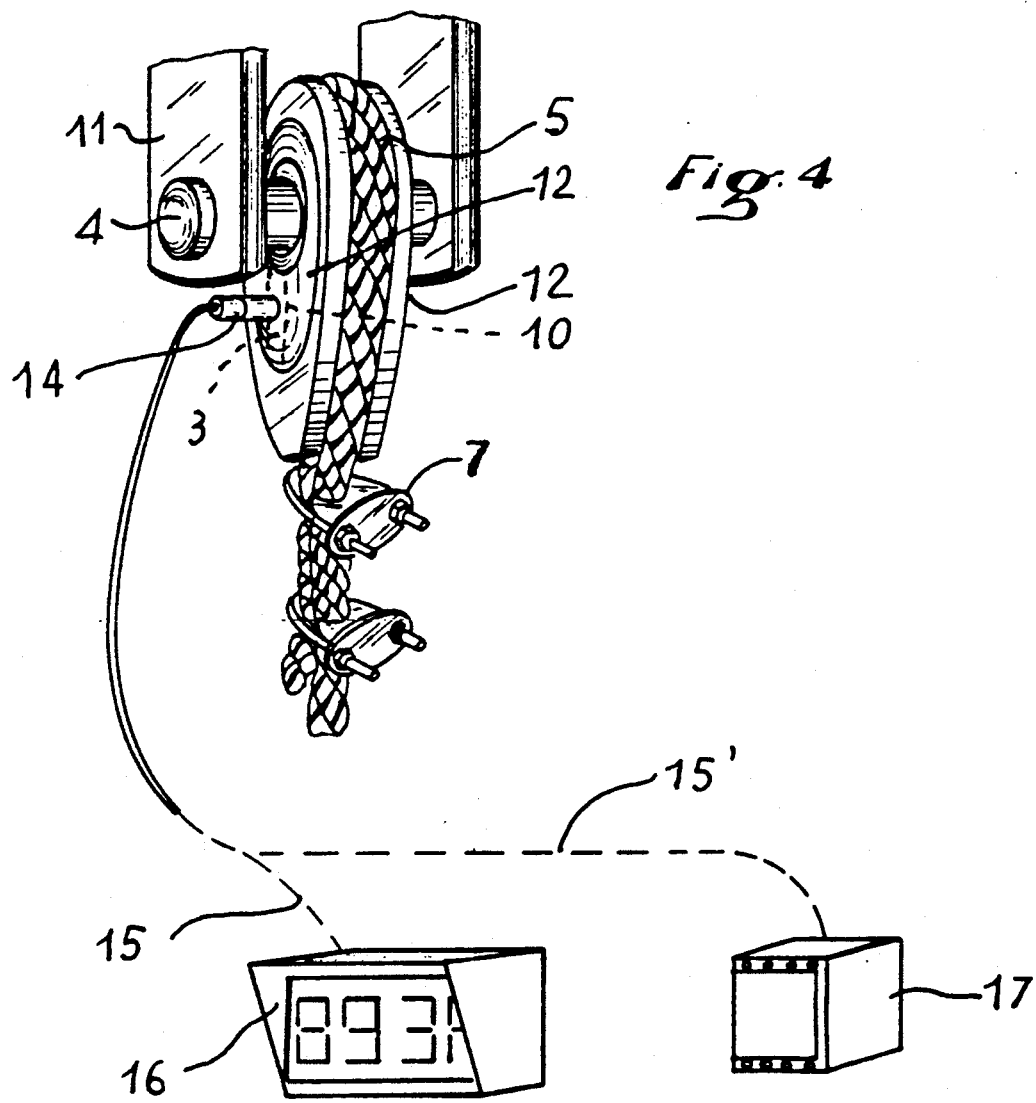
FIG. 4 is a perspective view of the force sensing device of FIG. 1, connected to complementary members displaying and working the measures performed by the stress gauges.

Referring now to FIG. 4, the device of FIG. 1 is placed between two flanges 12 integral with the structure of this device and forming a case therewith so as to contain and protect the elements of the stress gauge system 10. Through and opening in flange 12, the stress gauge system 10 carried by sector 3 is connected by means of a connecting member 14 and cables 15, 15' to complementary members comprising a stress display apparatus 16 and an overload tripping apparatus 17.

The case may advantageously comprise a mark indicating the axis of symmetry of the device so as to permit the operator to check the correct alignment thereof with the axis of the measured stress.

It will be readily understood that the above description has been given solely by way of example, without any limitative character, and that constructional additions or modifications could be made thereto without departing from the scope of the invention defined by the accompanying claims. It should in particular be understood that, although a device has been described having a circular shape convenient for manufacturing and positioning same, such a circular shape is not necessary and the device could have any other suitable shape.

What I claim is:

1. A stress sensing device using stress gauges which comprises a structure which transmits and canalizes stresses along a preferred direction and a stress gauge system carried by said structure, the structure comprising:
   (a) a ring to a point of the periphery to which is applied the resultant of an action force;
   (b) a hub disposed inside said ring and carried by a supporting shaft providing a reaction force, and action force and reaction force being aligned along a same axis, of opposite directions and directed one towards the other;
   (c) a sector connecting said hub to said ring and oriented along a single radius of the ring, said sector carrying said stress gauge system; said sector being disposed in a position diametrically opposite the point of application of the resultant of said action force to the ring periphery with relation to said supporting shaft providing the reaction force, so as to canalize towards said sector the stresses to be sensed resulting from said action and reaction forces, said structure being disposed on said supporting shaft in such a manner that said sector is automatically in line with the axis of said action and reaction forces.

2. Sensing device as claimed in claim 1 characterized in that each of the two lateral zones of the ring situated on each side of the transverse plane of symmetry of the device has a section reinforced so as to limit the flexion effect applied to these zones by the antagonism of the action and reaction forces.

3. Sensing device as claimed in claim 2 characterized in that said structure transmitting and canalizing stresses has a grooved periphery having the shape of a thimble to receive the loop of a cable to which is applied the action force to be sensed.

4. Sensing device as claimed in claim 3 characterized in that it comprises complementary means for handling, from a recording of the stresses canalized by the structure and measured by the stress gauge system, the measure of the action force applied to the cable.

5. Sensing device as claimed in claim 1 characterized in that said structure transmitting and canalizing stresses has a grooved periphery having the shape of a thimble to receive the loop of a cable to which is applied the action force to be sensed.

6. Sensing device as claimed in claim 5 characterized in that it comprises complementary means for handling, from a recording of the stresses canalized by the structure and measured by the stress gauge, system, measure of the action force applied to the cable.

* * * * *